United States Patent [19]
Breslin

[11] Patent Number: 4,497,370
[45] Date of Patent: Feb. 5, 1985

[54] APPARATUS AND METHOD FOR RECOVERY OF LIQUID HYDROCARBONS FROM GROUND WATER

[76] Inventor: Michael K. Breslin, 38 Caselli Ave., San Francisco, Calif. 94114

[21] Appl. No.: 407,514

[22] Filed: Aug. 12, 1982

[51] Int. Cl.³ .............................................. E21B 43/00
[52] U.S. Cl. ...................................... 166/372; 166/74
[58] Field of Search ................ 166/64, 67, 105, 105.5, 166/105.6, 74, 372; 210/924, 242.1

[56] References Cited

U.S. PATENT DOCUMENTS

| | | | |
|---|---|---|---|
| 2,524,933 | 10/1950 | Silverman | 166/64 |
| 2,980,184 | 4/1961 | Reed | 166/105 |
| 4,154,678 | 5/1979 | Kole | 210/242.1 |
| 4,243,529 | 1/1981 | Strauss | 210/242.1 |
| 4,273,650 | 6/1981 | Solomon | 210/923 |

Primary Examiner—Ernest R. Purser
Assistant Examiner—Mark J. DelSignore
Attorney, Agent, or Firm—Townsend and Townsend

[57] ABSTRACT

Apparatus and method for recovery of liquid hydrocarbons on ground water in which one or more perforate, small diameter (2 to 4 inch) well casings are installed in the ground in or at least adjacent to a contaminated soil area containing the liquid hydrocarbons. A liquid recovery unit is in each well casing and each recovery unit has a hollow housing covered by a semi-permeable membrane which passes liquid hydrocarbons but blocks the flow of ground water into the housing. The liquid hydrocarbons collected in the housings can be moved to a receiver by pressurizing the housings, by suction applied to the housings, by pressurizing the well casings, and by the use of submersible pumps near the housings. Several embodiments of the recovery units are disclosed.

45 Claims, 7 Drawing Figures

APPARATUS AND METHOD FOR RECOVERY OF LIQUID HYDROCARBONS FROM GROUND WATER

FIELD OF THE INVENTION

This invention relates to the recovery of liquid hydrocarbons (oils) which reside underground on top of ground water. The liquid hydrocarbons are present in such a state usually because of an unintentional oil spill from a storage tank or other facility.

BACKGROUND OF THE INVENTION

Proposals have been made in the past to provide an underground oil spill recovery system installed in one well using a first submersible pump to draw down the water table and create a "cone of depression" in the ground water. This "cone" funnels the oil floating on the ground water to the apex of the "cone" where it is recovered via a second submersible pump. The system includes a series of float switches to sense the relative levels of oil and water and to energize the appropriate pump. The system, however, requires a well having a 6 to 12 inch diameter casing. Such an oil recovery system is disclosed in U.S. Pat. No. 4,273,650.

Another underground oil spill recovery system is currently sold by Oil Recovery Systems of Greenville, N.H. The system, installed in one well, uses a submersible water pump to draw down the water table to create a "cone of depression" in the ground water table and thus allows oil to be drawn into the well. A floating oil recovery unit is then used to remove the oil from the well. The floating oil recovery unit uses a semi-permeable membrane which allows oil to pass but blocks the flow of water. Floats inside the unit electronically sense the presence of oil and actuate a pump located above and out of the well to remove the oil. This system requires a well casing having an inside diameter of approximately 24 inches. The system uses a single well to service an area encompassed by a circle having about a 100 foot radius and surrounding the well.

A proposal has been made for an oil detection system which signals the presence of oil residing on open waterways. The system includes a semi-permeable membrane which allows liquid hydrocarbons to pass while blocking the flow of water therethrough. Electronic sensors located inside the unit sense the presence of liquid hydrocarbons which have passed through the membrane. Such an oil detection and alarm unit is disclosed in U.S. Pat. No. 3,719,936.

None of the oil recovery systems described above discloses apparatus and a method for recovering liquid hydrocarbons from an underground site atop ground water without simultaneously removing the ground water itself in the process. The handling and disposal of the ground water removed to create the "cone of depression" is a major hindrance in the the use of the conventional recovery systems listed above. The problems incurred in the handling of such ground water are primarily due to costs since such systems require the following: Pumping equipment (a submersible water pump and water level control system with appropriate support systems, such as a power supply, structural supports, and a protective housing), ground water processing equipment (filters, valves, piping, storage tanks, and water purification equipment), ground water disposal procedures and equipment (injection wells or trenches and associated piping to deliver the water back into the ground), liquid hauling equipment to remove the ground water from the site if it cannot be put back into the ground, and fees associated with the use of disposal sites if the ground water is hauled away.

Another major problem arising from the use of the above systems is that the removal of ground water from an area will cause ground subsidence and will endanger buildings and other structures in the area. Further, the systems mentioned above use electronic sensors to monitor or sense the level and presence of oil. An electronic sensing unit in an oil recovery system increases the risk of fire and explosion.

None of the above systems are designed to function in small (2 to 4 inch) diameter wells which can be quickly and inexpensively installed. None of the above systems are designed to be used in a multitude of wells which are systematically drawn from in a prearranged sequence and controlled by a central, automatic control station. None of the above systems discloses a braking system designed to maintain the position of a hydrocarbon unit in a well casing regardless of the buoyancy of the recovery unit or the fluid levels. None of the above systems uses a track and lock mechanism inside a well casing to provide stability for the recovery unit and to hold the recovery unit in the desired location in the well casing.

Because of the foregoing drawbacks, a need has arisen for improvements in the recovery of liquid hydrocarbon residing on ground water due to spillage or other reasons.

SUMMARY OF THE INVENTION

The present invention fills the aforesaid need by providing an improved apparatus and method for recovery of liquid hydrocarbons which have escaped from storage tanks and other facilities into the ground and reside on the top of ground water. In the invention, recovery of liquid hydrocarbons is made from one or a multitude of small (2 to 4 inch) diameter wells without simultaneously withdrawing ground water in the recovery process. The invention requires no electronic sensors or switches in a well; thus, the probability of fire or explosion in a well due to electronic circuitry is eliminated. Since each well, in the practice of the invention, is relatively small, a substantial volume of volatile material cannot accumulate in the wells and damage from a fire or explosion, if one does occur in such a small well, would be far less than that resulting from a fire or an explosion in a larger well. Furthermore, in several of the embodiments of the invention, the liquid hydrocarbons never contact electronic components. This feature further serves to eliminate the possibility of fire and explosion within and outside of a well.

In carrying out the method of the present invention, one or a number of perforated well casings are installed in the ground in the area where the underground liquid hydrocarbons reside so that the hydrocarbons and ground water may enter the wells. Usually, each well may be 10 to 30 feet deep or more, and the distance between an adjacent pair of wells may be between 5 to 40 feet, depending upon soil conditions. The more porous soils allow for wider spacings. Soils with permeabilities of less than $10^6$ centimeters per second should have well spacings of about 5 feet; whereas in soils with permeabilities of the order of $10^{-2}$ centimeters per second or greater, the wells can be spaced up to forty feet apart. If the plume of liquid hydrocarbons is moving underground, a narrow trench may also be dug in the path of the moving hydrocarbons and filled with gravel, with the wells being set in the trench. An impermeable membrane or curtain on the down-gradient wall of the trench extending several feet below water level will serve to retain the oil in the trench while allowing ground water to pass beneath the barrier.

The perforations in each well casing extend a distance (approximately 3 feet) above and below the ground water level to allow water and oil to enter the well. A hydrocarbon recovery unit is placed in each well. The tubing for hydrocarbon recovery, pressure release, delivery of pressurized gas and the like is fed up and out of the well to a central control station and to a hydrocarbon storage tank at ground level. At the control station, selection can be made as to which well will be drawn upon at what time and for how long. The selection process can be determined by a timer and a series of remotely actuated valves controlled by the timer. The valves are located a distance from the wells. Liquid hydrocarbons may be drawn from the wells through the valves by suction, or pressurized gas may be directed through the valves to individual wells to push the liquid hydrocarbons from the wells to the storage recovery tank at ground level.

Since no water is removed from the wells in the practice of the invention, no "cone of depression" is formed in the ground water to draw the hydrocarbons to the well as in conventional systems described above. Rather, liquid hydrocarbons are removed from the top of the ground water and the ground water is left in place. This feature allows the remaining lighter liquid hydrocarbons outside the well to be displaced by the heavier water and caused to flow to the well through the same geologic strata which allowed the hydrocarbons to reach the well in the first place.

It is well known that an oil layer found in a small monitoring well has generally two to four times the thickness of the oil layer in the surrounding soil. This means that the oil will seek out and remain in small diameter wells rather than remain in the soil. The technique of using many small recovery wells, therefore, takes advantage of this natural phenomenon which has not heretofore been significantly employed in systems of the prior art. On the contrary, prior art systems teach away from this approach because they require that the water table be drawn down to enhance the movement of the oil to a well where it can be collected. In drawing down the water table, the oil must travel along a path which could be blocked by many obstructions, such as clay deposits, rocks, old building foundations and the like. The recovery method of the present invention, on the other hand, permits the liquid hydrocarbons to reach numerous recovery wells to which the hydrocarbons are naturally drawn by way of paths through the soil which the hydrocarbons have already traversed. This is possible because the small diameter recovery wells are placed within the contaminated area or on the edge of the contaminated area.

In the present invention, small diameter wells and individual recovery units in the walls are inexpensive to produce and maintain. Also, they are easily installed and a number of them can be quickly installed in proximity to each other over a given area. This feature provides a distinct advantage over prior art systems since the cost of labor and materials used to install a number of small (2 to 4 inch) diameter wells is less than that for labor and materials used to install one relatively large (6 to 24 inch) diameter well of prior art systems.

The conventional practice of well installation requires an annulus between the well casing and the earthen sides of the surrounding bore hole. This annulus is filled with a very permeable material, such as gravel or sand; thus, a bore hole 3 to 12 inches larger in diameter than the outside diameter of the well casing is required. The diameter of the bore hole is generally 50 to 100 percent larger than the diameter of the well casing. Thus, a 6 inch diameter well casing requires a 10 to 12 inch diameter bore hole. Further, a 24 inch diameter well casing usually requires a 36 inch diameter bore hole. To drill such large bore holes requires very large, continuous flight augers or the use of a casing or drilling fluid to maintain an open bore hole while using a bucket rig to remove the soil. If the soil is not stable, as in the case of running sand, a continuous flight auger cannot be used since the removal of soils without a casing would cause more soil to flow to the auger which would eventually cause an undermining of the ground on which the drill rig is operating.

In contrast to the use of relatively large diameter wells, small (2 to 4 inch) diameter wells can be easily installed, even in very sandy soils, using commercially available hollow stem augers of 4 to 8 inch inside diameters. The bore hole is kept open by the auger itself and the well casing is put down the center of the auger and left in place as the auger is withdrawn. The use of such augers is commonplace in the installation of ground water monitoring wells. Further advantages to installing smaller wells is the speed at which they can be installed, the relatively small amount of contaminated soil removed from the holes which must be disposed of, and the ability to use the wells as monitoring and sampling points besides being used as recovery wells.

Another advantage of the present invention is that a total of 36 three-inch diameter wells, with six-inch diameter bore holes, or a total of 81 two-inch diameter wells, with four-inch diameter bore holes, can be installed in a given area with the same amount of soil removal as one 24-inch diameter well with a 36-inch diameter bore hole. Since it is common when using prior art systems to install a dozen monitoring wells to monitor the success or failure of one large well, this brings the number of smaller wells which, in the present invention, can be drilled without removing more soil than would be removed by the use of prior art systems to about 50 three-inch wells and over 90 two-inch wells.

By using the present invention, a 10,000 square foot area, which is approximately the area affected by leakage from a faulty gasoline station storage tank, could be gridded with wells on 20 foot centers with only 25 wells which would require the removal of only 30 to 50 percent of the soil volume which would be removed when using prior art systems. In such a case, the greatest distance through which liquid hydrocarbons would be required to travel would be 14 feet, assuming the oil were to be in the center of a gridded square. Since it is not uncommon to have an underground plume of oil or gasoline travel 50 feet in five years or less, all of the oil or gasoline in the situation described should approach one of the 25 wells close enough to be drawn in and removed within one year. In some prior art systems, recovery units have been in use for well over a year and the plume has not been significantly reduced. In some cases, the amount of water which would have to be removed to make a prior art system function has been found to be too large to make recovery of liquid hydrocarbons practical; thus, the systems were not actuated and no liquid hydrocarbons were recovered. In the practice of the present invention, liquid hydrocarbons do not have to travel a great distance (usually less than 20 feet) to the nearest well; hence, the time required to recover the spilled hydrocarbons is substantially less than when using prior art systems in the practice of which spilled hydrocarbons must often travel over 100 feet to reach the recovery well.

In the practice of the present invention, liquid hydrocarbon units recover lighter-than-water, immiscible hydrocarbons but do not take in water. Water is prevented from entering the hydrocarbon recovery units by a semipermeable membrane which selectively allows hydrocarbons to pass but blocks the passage of water therethrough. Such membranes have been known for some time. A typical membrane is one made by coating a metal screen with polytetrafluoroethylene (Teflon). After passing through the membrane, liquid hydrocarbons can be removed from the recovery units by any one of four different steps, namely by the use of a submersible pump, by well pressurization, by the use of a suction pump, and by recovery unit pressurization. The recovery units, regardless of their differences of operation, are all designed to keep part of the membrane approximately at the liquid hydrocarbon/water interface. In this way, liquid hydrocarbons floating on the ground water always have access to the membrane but the ground water is blocked by the membrane. The recovery units are emptied of their hydrocarbon contents on a prescribed cyclical basis which is controlled from the central control station. At the control station, a programmable timer controls the number of solenoid actuated valves. The valves determine which recovery unit is to be operated. The timer determines when and for how long a specific well will be drawn upon.

The primary object of the present invention is to provide an improved apparatus and a method for recovering liquid hydrocarbons which reside underground on the top of ground water wherein the hydrocarbon is made to flow into one or more small diameter wells built into the ground in a contaminated area and the liquid hydrocarbons are drawn out of the individual wells on a cyclical basis without drawing the ground water out of the ground to thereby minimize costs of recovery and avoid the possibility of fire, explosion and ground subsidence.

Other objects of this invention will become apparent as the following specification progresses, reference being had to the accompanying drawings for an illustration of several embodiments of the invention.

Figure 1:
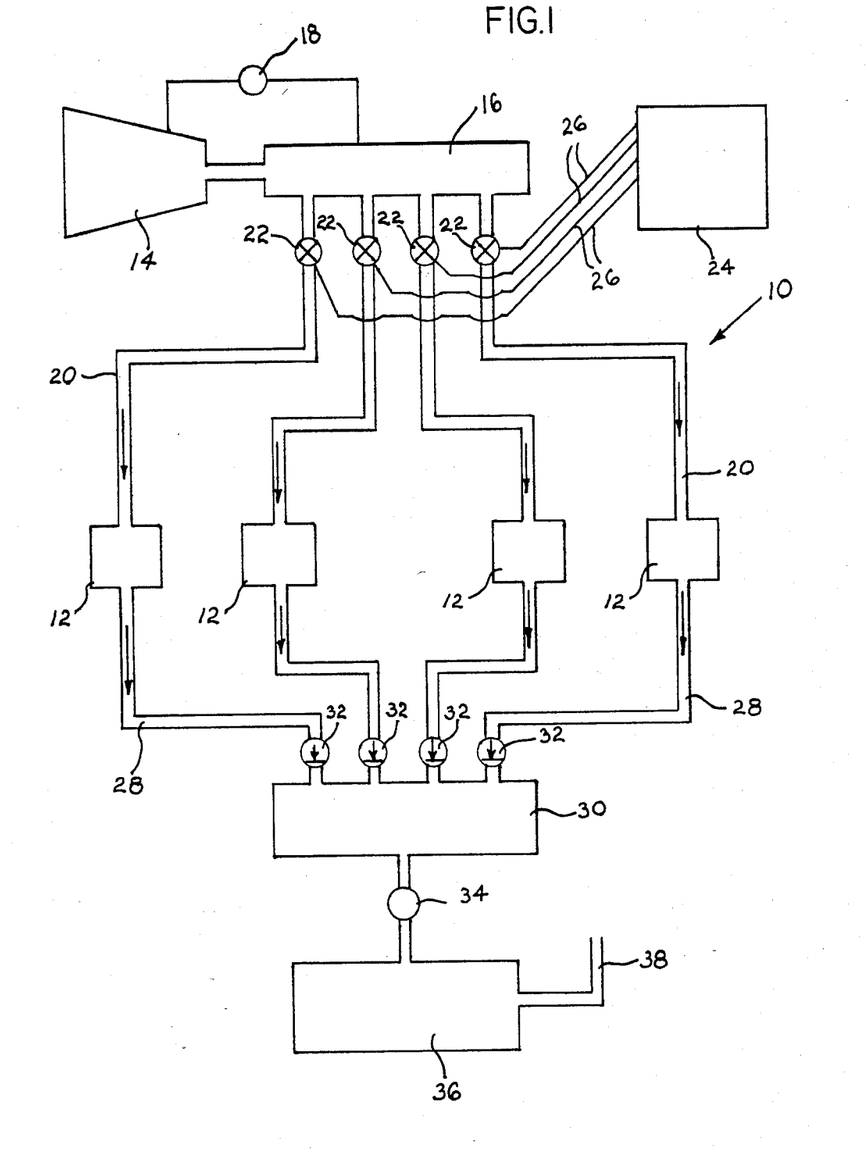
FIG. 1 is a schematic view of a first embodiment of the system for recovery of liquid hydrocarbons, showing a number of recovery units in individual, small diameter wells, and a subsystem for selectively pressurizing the various recovery units.

In a first embodiment of the invention, a system 10 for recovery of liquid hydrocarbons from the upper surface of ground water is shown in FIG. 1 and includes a number of recovery units 12 located in respective, small diameter wells drilled in the ground in a contaminated area containing spilled hydrocarbons. The spacing between the wells is typically 10 to 40 feet and the depth of each well can be 10 to 30 feet or more. A description of each recovery unit 12 is set forth hereinafter with reference to FIG. 2.

System 10 further includes an air compressor 14 at ground level which feeds pressurized air into a manifold 16 and is provided with a feedback element 18 to maintain manifold 16 at a constant pressure. A number of pipes 20 interconnect the manifold 16 with individual recovery units 12 through respective valves 22. The valves are solenoid actuated and are selectively controlled by a timer (not shown) in a control station 24 at ground level. Electrical leads 26 connect the timer with the various valves.

Pressurized air from manifold 16 is used to pressurize each recovery unit so that hydrocarbons in the recovery unit can be forced out of the same through a pipe 28 to a manifold 30 through one-way check valves 32. An over-pressurization valve 34 connects the manifold to a storage tank 36 open to the atmosphere by means of a vent 38.

Manifold 16 awaits the opening of one or more valves 22 which allow passage of pressurized air into one or more recovery units 12. Also, valve 34 is opened at the same time as a valve 22 is opened. The opening of a valve 22 is controlled by the timer at control station 24, and the valves 24 remain open for a predetermined times. Control station 24 contains override switches which allow control of the valves by an operator.

Figure 2:
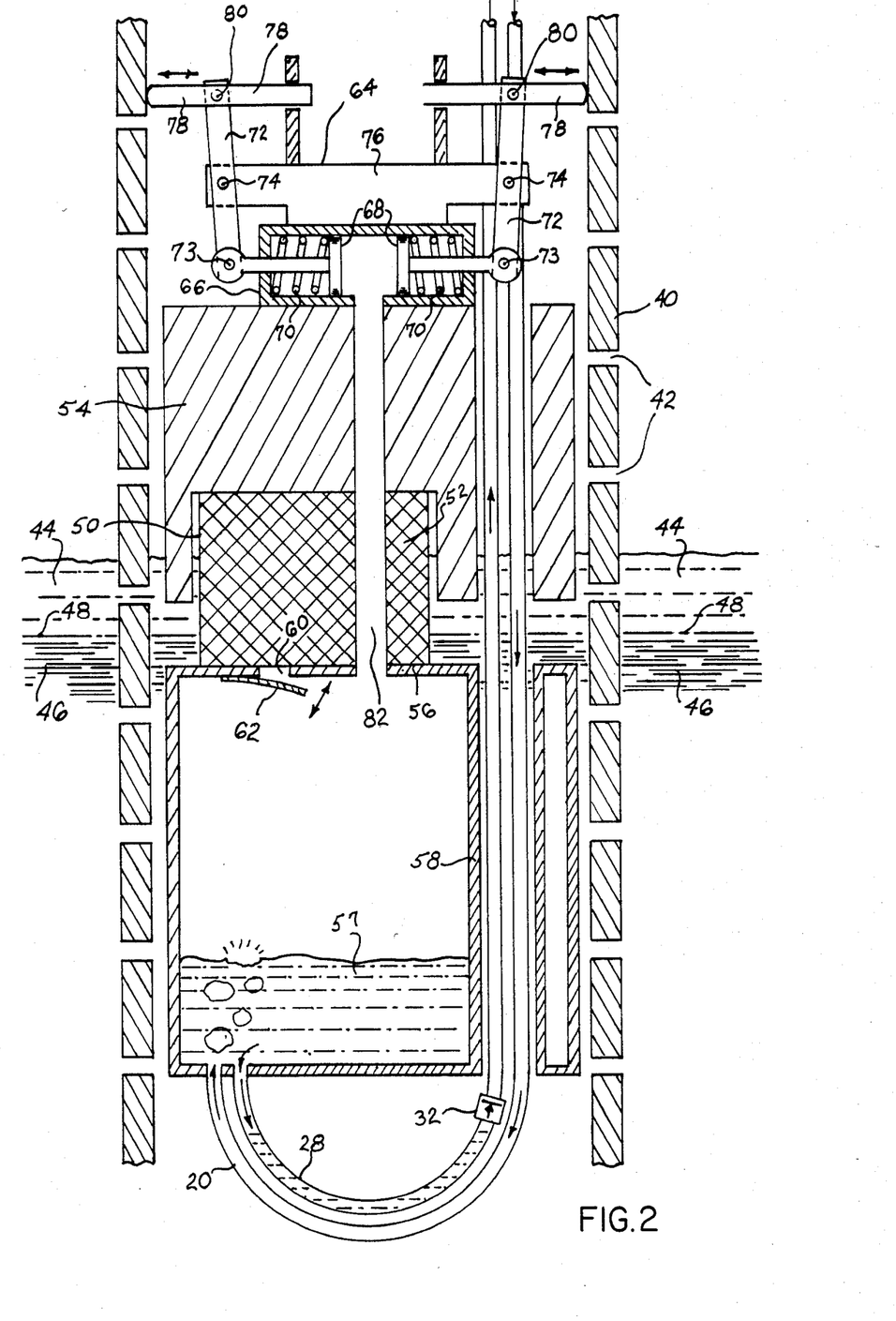
FIG. 2 is an enlarged, cross-sectional view of a recovery unit used in the embodiment of FIG. 1.

FIG. 2 shows a recovery unit 12 in more detail in an individual well. The well casing 40 is perforated to present holes 42 to allow liquid hydrocarbons and ground water to seep into the well. The pool of liquid hydrocarbons is denoted by the numeral 44, the pool of ground water is denoted by the numeral 46, and the interface between pools 44 and 46 is denoted by the numeral 48.

Recovery unit 12 includes a housing 50 covered by a semi-permeable screen or membrane 52 which allows liquid hydrocarbons to enter the housing 50 but ground water is blocked from flowing into the housing. A flotation member 54 is coupled with housing 50 and causes the housing to remain buoyant on the ground water such that lower portion of the housing 50 is intersected by the interface 48 between the liquid hydrocarbons and the ground water as shown in FIG. 2. Flotation member 54 can be of any suitable construction, such as a cellular construction in which the member 54 has a specific gravity less than that of water.

Housing 50 is mounted on the top wall 56 of a receptacle 58 having an opening 60 communicating with housing 50, the opening 60 being controlled by a one-way flapper valve 62 secured to the underside of top wall 56. Valve 62 is arranged so that liquid hydrocarbons can flow into receptacle 58; however, pressurized air directed into receptacle 58 will cause valve 62 to close opening 60. Receptacle 58 is designed to fit into the well casing 40 below interface 48, and the assembly of housing 50, flotation member 54 and receptacle 58 float on the ground water but can be held in a fixed position by a releasable brake 64 mounted on the upper end of flotation member 54.

Brake 64 includes a cylinder 66 having a pair of pistons 68 which are biased toward each other by coil springs 70 in cylinder 66. The pistons have rods pivotally coupled to crank arms 72 which are pivotally mounted intermediate their ends by pins 74 on a support plate 76 rigid to cylinder 66. Rigid legs 78 are pivotally mounted intermediate their ends by pins 80 on the upper ends of crank arms 72, and the outer ends of legs 78 are adapted to bear against the inner surface of well casing 40 when springs 70 bias 68 toward each other in cylinder 66. In this way, the outer ends of the legs frictionally engage the inner surface of well casing 40 and releasably hold the flotation member 54 in a fixed position with reference to interface 48. The legs 78 are backed away from well casing 40 by a pressurizing cylinder 66, causing pistons 68 to move away from each other against the bias forces of springs 70, causing crank arms 72 to move legs 78 toward each other. The interior of cylinder 66 is pressurized by pressurizing the interior of receptacle 58, the latter being coupled to the interior of cylinder 66 by a fluid passage 82 through housing 50 and flotation member 54.

Brake 64 is not limited to engagement with the inner surface of well casing. Legs 78, for instance, may be frictionally engageable with other structure in the well casing, such as the adjacent segments of pressure pipe 20 and delivery pipe 28 (FIG. 2). Moreover, the braking system is not limited to the design shown in FIG. 2. The braking system may include a ratchet system which engages a gear strip on the inner surface of well casing 40 or on the adjacent segments of pipes 20 and 28. The braking system can also be a bladder which is inflated with air or water, a float actuated brake or any other automatic system which provides for the stationary positioning of recovery unit 12 in well casing 40.

The recovery unit is ballasted to float freely on the ground water pool 46 in a manner such that, when receptacle 58 is empty, membrane 52 of housing 50 is exposed to the liquid hydrocarbon pool 44. When brake 64 is applied, recovery unit 12 will remain in a position corresponding to the condition at which receptacle 58 is empty. Recovery unit 12 will remain in this position even as the receptacle 58 receives liquid hydrocarbons 57 from housing 50.

In the practice of the method relating to system 10, a number of small diameter (2 to 4 inch) wells are drilled into the ground to a sufficient depth such that well casings 40 of the well extend above and below the interface between the liquid hydrocarbons and the ground water. In each well, a recovery unit 12 is inserted in the well casing 40 thereof and pipes 20 and 28 will extend also into the well casing in the manner shown in FIG. 2 such that pipe 20 will communicate with the bottom of receptacle 58 to pressurize the same while pipe 28 will also communicate with the bottom of receptacle 58 and provide a return or delivery line for hydrocarbons forced out of the receptacle 58 by pressurization. Initially, for positioning recovery unit 12 so that it floats freely, the corresponding valve 22 is opened while valve 34 remains closed. This causes receptacle 58 and cylinder 66 to be further pressurized to thereby cause legs 78 to be retracted from engagement with the inner surface of well casing 40, thereby permitting of the recovery unit to float freely on the ground water 46 below interface 48. Then, valve 22 is closed and valve 34 is opened. Thus, the recovery unit is locked in place by brake 64. While the lock is thus engaged, liquid hydrocarbons can flow into housing 50 through membrane 52 and then into receptacle 58 through opening 60 past valve 62.

When the recovery unit is to be emptied of liquid hydrocarbons, valves 22 and 34 are opened, allowing pressurized air through pipe 20 into receptacle 58. This action closes valve 62, forcing liquid hydrocarbons in receptacle 58 out of the same through pipe 28 past a check valve 32 and into and through manifold 30, valve 34 and into tank 36 for storage purposes. Since valve 34 is opened, there is no movement of pistons 68 away from each other to unlock break 64. The receptacle 58 is thus emptied of liquid hydrocarbons.

After a predetermined time interval, valve 34 is closed so that pressure builds up inside cylinder 66 by way of fluid passage 82. When this occurs, the pistons 68 will be moved away from each other and brake 64 will be unlocked, allowing the recovery unit to float freely to position housing 50 at the interface 48. This action is typically necessary since the ground water level can change and the recovery unit 12 must remain at the interface 48 for optimum performance. After a second time interval, valve 34 is opened to relieve the pressure in receptacle 58 and set brake 64 once again. The incoming pressurized air is shut off at the same time. The recovery unit is then ready to receive more liquid hydrocarbons and to remain in place in the well unit until it is selected to be emptied once again during the next time cycle of operation.

Recovery unit 12 in FIG. 2 may be operated without brake 64 and fluid receptacle 58, allowing the housing 50 to float freely and to be supported by floatation member 54. The liquid hydrocarbons are then drawn directly from the bottom of the housing 50 by suction or well pressurization as will be described hereinafter. Also, an air driven submersible pump may be mounted on the bottom of housing 50 to pump liquid hydrocarbons out of the housing. A suction pump on the ground level may be used to draw the liquid hydrocarbons from housing 50. In this case, pipe 20 is not needed and only pipe 28 is necessary for the recovery unit to operate.

Figure 3:
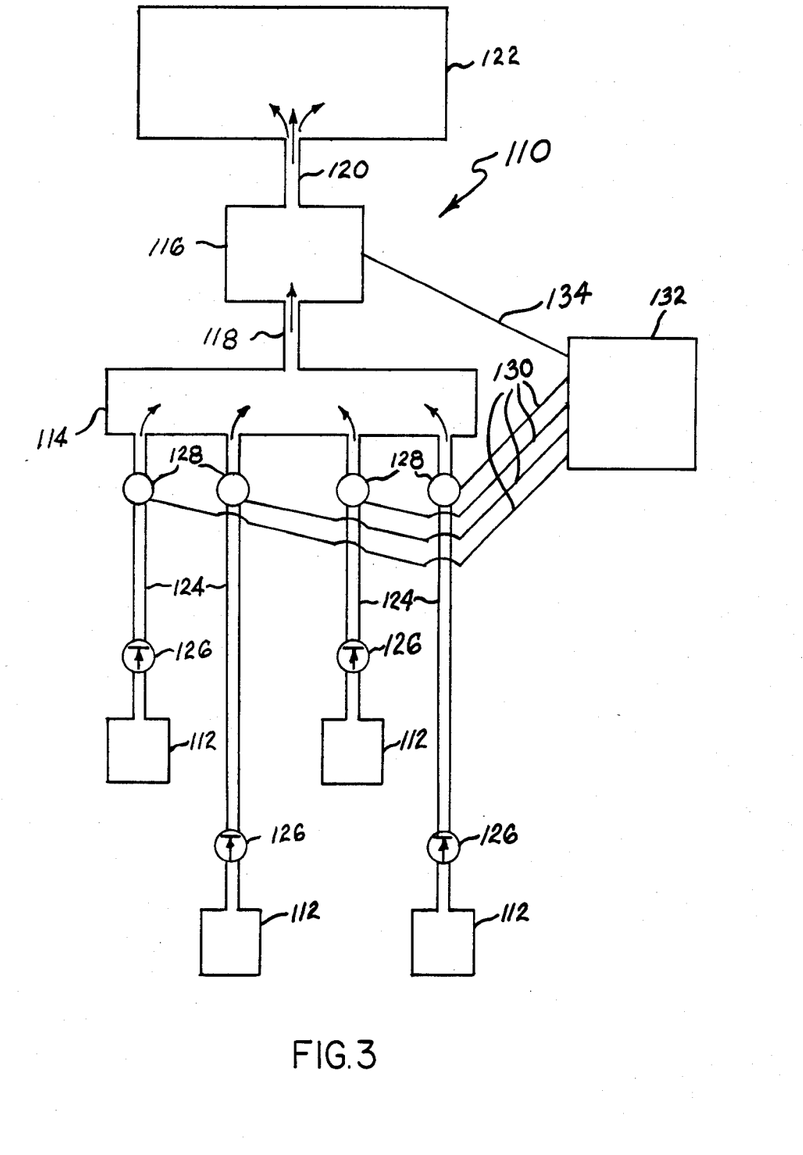
FIG. 3 is a view similar to FIG. 1 but showing another embodiment of the invention using a suction subsystem for hydrocarbon removal from a number of recovery units.

FIG. 3 shows another embodiment of the system of the present invention, the system being denoted in FIG. 3 by the numeral 110. System 110 includes a number of recovery units 112 in individual, small diameter wells drilled into the ground in a contaminated area containing liquid hydrocarbons on ground water. System 110 further includes a manifold 114 coupled to a suction pump 116 by way of a pipe 118. The suction pump is connected by a pipe 120 to a storage tank 122 at ground level. The individual recovery units 112 are coupled by pipes 124 to manifold 114. Each pipe 124 has a one way check valve 126 and a solenoid actuated valve 128 coupled by electrical leads 130 to a timer (not shown) at a control station 132 at ground level. The timer is also coupled to suction pump 116 by electrical leads or another method such as air lines represented by line 134 in FIG. 3. It is possible that a manifold 114 could serve as the storage tank so that the liquid hydrocarbons need not pass through suction pump 116.

Figure 5:
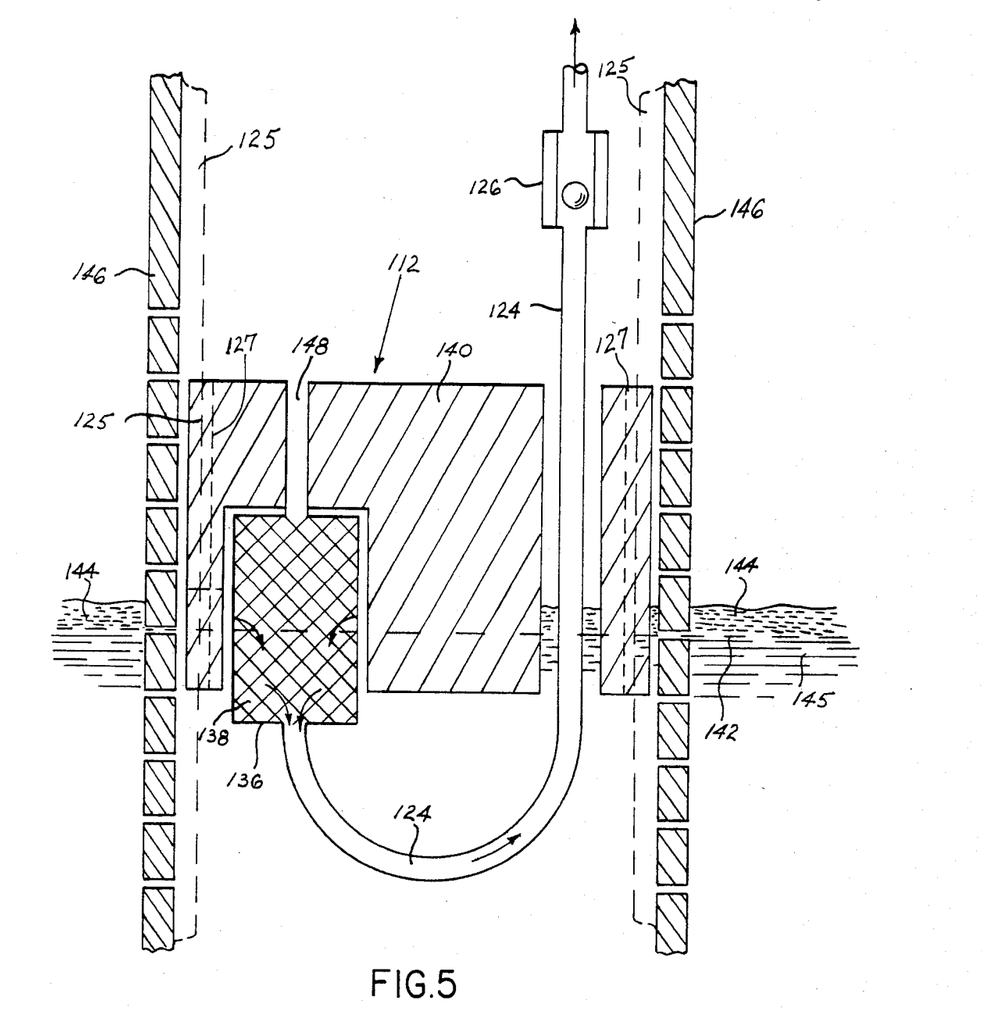
FIG. 5 is a view similar to FIG. 2 but showing a recovery unit for use in the embodiments of FIGS. 3 and 4.

A recovery unit 112 is shown in FIG. 5. It comprises a housing 136 covered by a semi-permeable membrane 138 of the same type described above with respect to membrane 52 in FIG. 2. A floatation member 140 is coupled with housing 136 and causes it to float on the interface 142 between a liquid hydrocarbon pool 144 and a ground water pool 145 below the interface. The recovery unit 112 is within a well having a perforate well casing 146 so that liquid hydrocarbons can flow into the well casing and into and through membrane 138 into housing 136. Ground water cannot flow through membrane 138. A fluid passage 148 places the interior of housing 136 in fluid communication with the open air space above the recovery unit 112 to prevent a pressure differential from developing between the interior of the housing 136 and the atmosphere in the well casing 146. Such a differential could detract from the effectiveness of the semipermeable membrane 138.

Tube 124 is shown with one way check valve 126 in FIG. 5. The lower end of tube 124 is coupled to the bottom of housing 136 and communicates therewith to receive liquid hydrocarbons therefrom when suction is applied to manifold 114 by suction pump 116. The tube 124 loops down below the recovery unit 112 and passes upwardly through the recovery unit to the top of the well casing. The tube 124 is flexible through the loop so that the floating recovery unit 112 can freely respond to changes in fluid levels in the well casing 40.

In operation, a plurality of wells are drilled into the ground in the contaminated area. The well casings 146 are put into place and the individual recovery units 112 are lowered into the well casings and float on the ground water in the manner shown in FIG. 5.

The timer in control station 132 actuates valves 128 on a cyclical basis. Each time a valve 128 is opened, suction pump 116 is actuated. This causes the liquid hydrocarbon in the housing 136 of the corresponding recovery unit 112 to be drawn by suction out of housing 136, through tube 124, past valve 128 and into the manifold 114. The liquid hydrocarbons can either be stored in the manifold 114 or be delivered through suction pump 116 to storage tank 122. Since recovery unit 112 in FIG. 5 is freely floating, it will rise and fall due to changes in the level of the ground water in the well.

Figure 4:
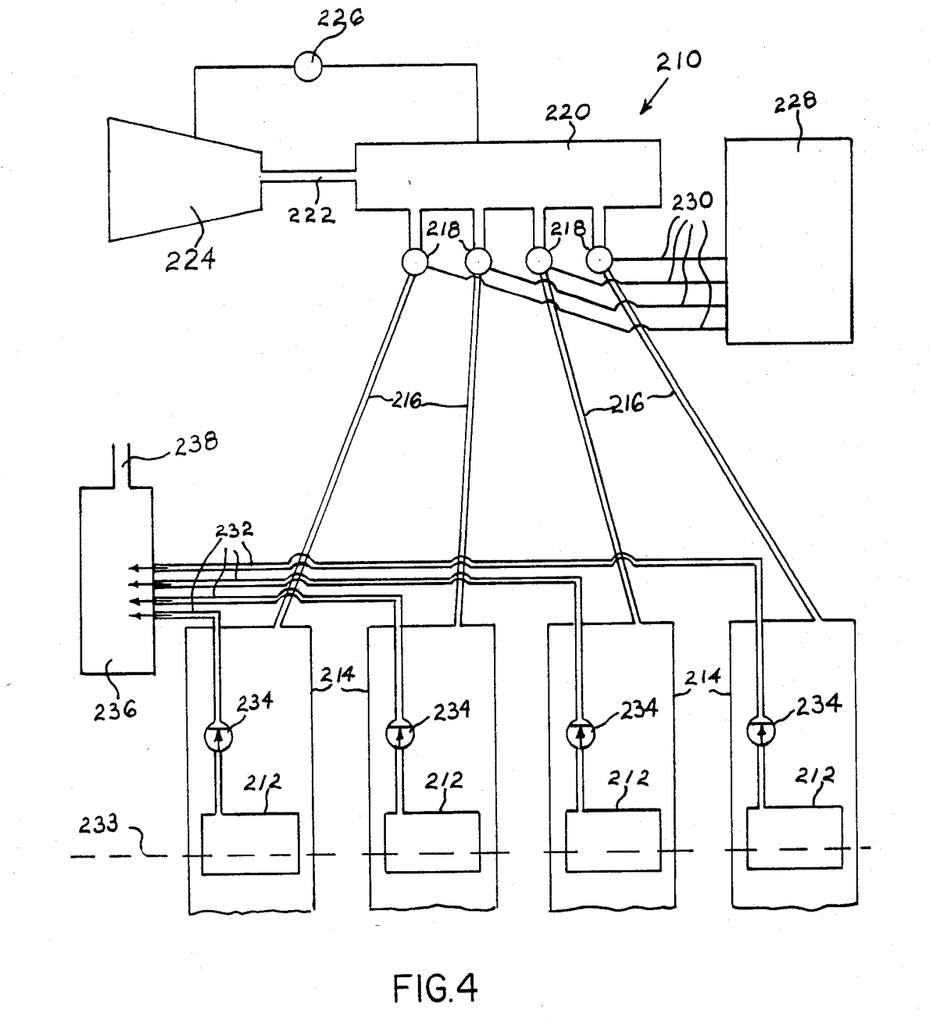
FIG. 4 is a view similar to FIGS. 1 and 3 but showing an embodiment of the invention using a well pressurization subsystem for removal of hydrocarbons from a number of recovery units.

FIG. 4 shows another embodiment of the system of the present invention, the system being denoted by the numeral 210 and being operable to pressurize individual wells to force liquid hydrocarbons out of the wells and into a storage tank. System 210 includes a number of recovery units 212 located in individual wells 214 having perforate well casings in the manner shown in FIGS. 2 and 5. Also, the particular recovery units 212 can be of the same type as recovery units 112 shown in FIG. 5.

System 210 includes a number of pipes 216 which extend into respective wells 214 and are coupled to respective valves 218 to a manifold 220 coupled by a pipe 222 to an air compressor 224 having a feedback system 226 to keep manifold 220 at a prescribed pressure. A control station 228 contains a timer (not shown) coupled by leads 230 to respective valves 218 to sequentially actuate the valves and couple manifold 220 with the interiors of individual wells 214 One or more valves 218 can be operated at any one time.

Each recovery unit 212 has a delivery pipe 232 provided with a one way check valve 234 which allows liquid hydrocarbons to pass from the recovery unit to a storage tank 236 having a vent 238 to the atmosphere.

Each recovery unit 212 includes a housing having a semi-permeable membrane. Housing 136 and membrane 138 of FIG. 5 are suitable for this purpose. The housing is coupled to a floating member so that the housing will float on the ground water and will be intersected by the interface 233 between the ground water and liquid hydrocarbons on the ground water.

In the operation of system 210, the recovery units 212 are put into the respective well and allowed to float on the ground water in the wells. The manifold 220 is pressurized by the operation of compressor 224 and the timer in control station 228 at ground level causes valves 218 to be sequentially actuated.

When a valve 218 is actuated, it opens the corresponding pipe 216, thereby causing pressurized air in manifold 220 to pressurize the corresponding well 214. Assuming that recovery unit 112 of FIG. 5 is used in each well, the pressurized air in the well will enter passage 148, will pass through housing 136 and force liquid hydrocarbons out of housing 136 through tube 124. The liquid hydrocarbons will be pumped into tank 236 for storage purposes. After a predetermined time interval, the corresponding valve 218 will close and another valve 218 will be opened and the above process will be repeated. The one way check valves 234 in pipes 232 prevent pressurized gas from escaping into other recovery units. After a particular valve 218 is closed, internal pressure of the corresponding wall casing returns to atmospheric pressure by venting of pressure through pipe 232 to the recovery tank 236 which has vent 238 associated with it.

Figure 6:
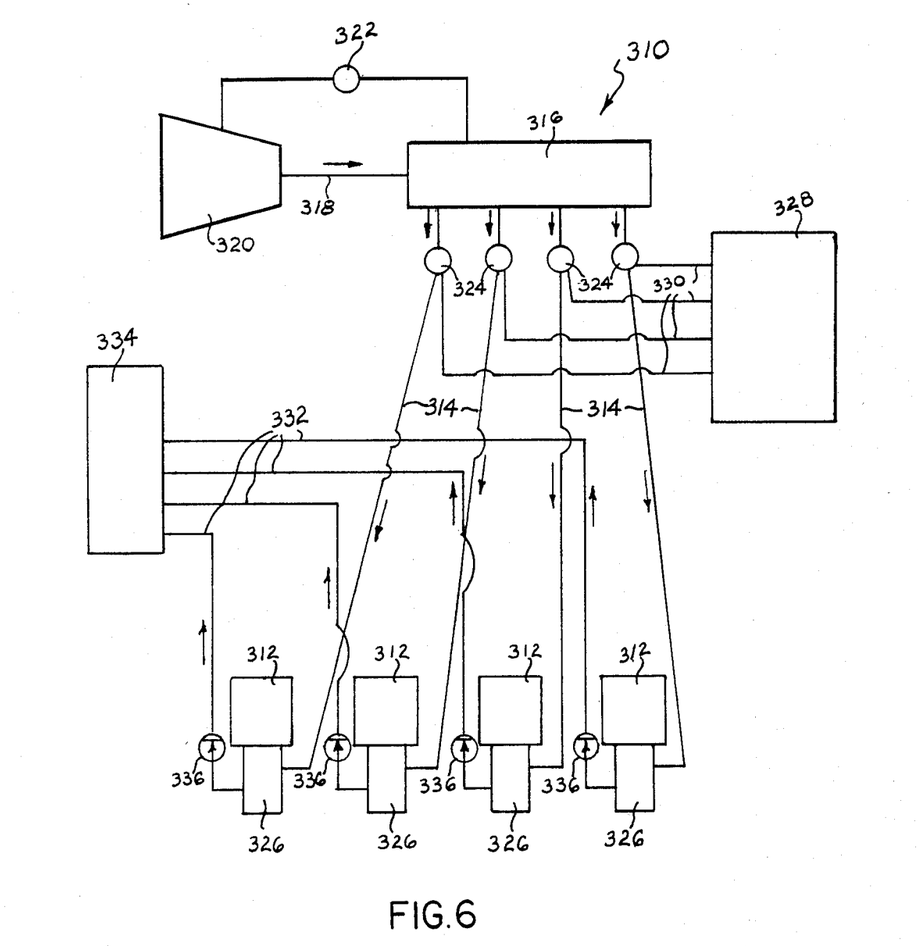
FIG. 6 is a schematic view similar to FIGS. 1, 3, and 4 but showing an embodiment using submersible pumps for removing the liquid hydrocarbons from a number of recovery units.

FIG. 6 is a schematic view of still another embodiment of the system of the present invention, the system having a number of recovery units and a sumersible pump for each recovery unit, respectively. The system of FIG. 6, broadly denoted by the numeral 310 includes a number of recovery units 312 placed in individual wells drilled into the ground and deep enough so that the recovery units can float on the ground water. Each well will have a perforate well casing as described above with respect to the other embodiments of the invention. The construction of each recovery unit 312 will be described hereinafter with reference to FIG. 7.

System 310 includes a pipe 314 for each recovery unit respectively, the pipe extending downwardly from a manifold 316 coupled by a pipe 318 to an air compressor 320 having a feedback mechanism 322 to maintain the air pressure in manifold 316 at a preselected value. Each pipe 314 has a fluid valve 324 coupled therewith to supply pressurized air to a submersible air-driven pump 326 associated with the corresponding recovery unit 312. Each valve 324 is controlled by a timer (not shown) at a control station 328 at ground level, the timer being coupled by leads 330 to the individual valves 324.

The fluid outlets of pumps 326 are coupled by pipes 332 to a storage tank 334 typically at ground level. Each pipe 332 has a one-way check valve 336 coupled therewith to allow passage of liquid hydrocarbons from the corresponding pump 326 only in one direction, namely the direction toward storage tank 334.

Figure 7:
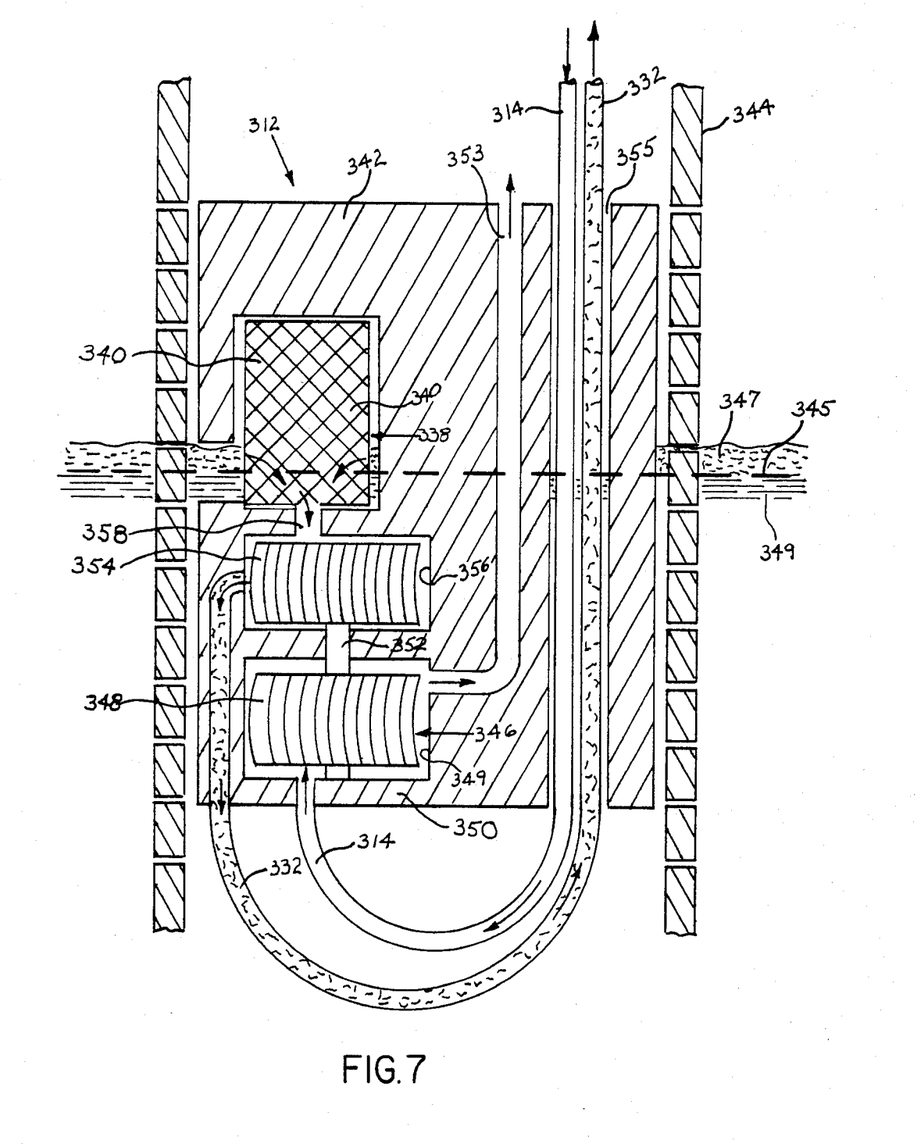
FIG. 7 is a view similar to FIGS. 2 and 5 but showing a recovery unit for the embodiment of FIG. 6.

Each recovery unit 312 is shown in more detail in FIG. 7. Recovery unit 312 includes a housing 338 covered by a semipermeable membrane 340 of the type described above with respect to the other embodiments. Housing 338 is carried by a floating member 342 which floats on the ground water and positions the housing 338 at the interface 345 between the liquid hydrocarbons 347 and the ground water 349. Flotation member 342 is small enough to fit into a small diameter (2 to 4 inch) well casing 344 which extends above and below the interface 345.

A submersible pump 346 is coupled to flotation member 342 and includes a pneumatic motor 348 mounted in a recess 349 on a support 350 and provided with a shaft 352 coupled with an impeller 354 in a recess 356 coupled by a fluid passage 358 to the interior of housing 338. The corresponding tube 314 is in fluid communication with the recess 349 containing motor 348 so that air under pressure from the manifold 316 can be directed through tube 314 into recess 349 to operate motor 348 and cause rotation of impeller 354. Rotation of impeller 354 causes liquid hydrocarbons to be drawn out of the bottom of housing 338 and into and through the corresponding delivery tube 332 to storage tank 334.

In operation, the various wells are drilled in a contaminated area. Recovery units 312 are inserted into the corresponding well casings 344 so that the recovery units float on the ground water in the position shown in FIG. 7. Liquid hydrocarbons flow into housing 338 and accumulate therein while the recovery unit awaits the opening of the corresponding valve 324.

When a valve 324 is opened, the valve allows air under pressure to be directed from manifold 316 into the corresponding recess 349 to actuate motor 348. This causes rotation of impeller 354, causing liquid hydrocarbons to be pumped out of the corresponding housing 338, through pipe 332 and into storage tank 334. After a predetermined time interval, the valve 324 is closed and a second valve 324 is opened and the process is repeated. During the operation of the submersible pump 348 and each recovery unit 312, air under pressure is vented from recess 349 through a fluid passage 353 to the atmosphere above the recovery unit 312. The well casing 344 is vented to the atmosphere at ground level. Passage 355 is provided in flotation member 342 to accommodate pipes 314 and 332.

In each recovery unit of all of the embodiments above, means may be provided to prevent the recovery unit from rotating about a vertical axis and becoming cocked in the respective well casing. This means may be a vertical rib or track on the inner surface of the well casing and the recovery unit 112 will have a side recess for receiving the rib but will allow the recovery unit to move relative to the rib. In FIG. 5, a pair of ribs 125 are shown in dashed lines at diametrically opposed locations on the inner surface of well casing 146, and flotation member 140 has a pair of recesses 127 for shiftably receiving the ribs.

What is claimed is:

1. Apparatus for recovery of liquid hydrocarbons on ground water below ground level comprising: a plurality of well casings, the well casings being perforated and adapted to be driven into the ground through the interface between the liquid hydrocarbons and the ground water so that the liquid hydrocarbons can enter the well casings; a recovery unit for each well casing, respectively, each recovery unit including a housing for collecting liquid hydrocarbons, the housing having a semi-permeable membrane defining the outer surface thereof, the membrane being pervious to the liquid hydrocarbons and impervious to the ground water, and a flotation member coupled with the housing to permit the latter to be floated on the ground water such that a portion of the housing intersects the interface between the liquid hydrocarbons and the ground water; a conduit coupled with each recovery unit, respectively and adapted to be coupled to a fluid receiver remote from the recovery units for directing liquid hydrocarbons from the housing to the receiver; and means coupled with the recovery units for sequentially forcing the collected hydrocarbons from the recovery units to the receiver.

2. Apparatus as set forth in claim 1, wherein said forcing means includes means for supplying a positive fluid pressure to each recovery unit to force the liquid hydrocarbons collected thereby through the respective conduit and toward the receiver.

3. Apparatus as set forth in claim 1, wherein said forcing means includes suction means coupled with the conduit of each recovery unit for drawing liquid hydrocarbons through the conduit by a suction force.

4. Apparatus as set forth in claim 1, wherein said forcing means includes means for pressurizing each well casing to force collected liquid hydrocarbons through the respective conduit and toward the receiver.

5. Apparatus as set forth in claim 1, wherein said forcing means includes a submersible pump for each well casing, respectively, each pump having an impeller for directing the liquid hydrocarbons through the respective conduit toward the receiver.

6. Apparatus as set forth in claim 1, wherein said forcing means includes a valve for each well casing, respectively, each valve being operable to allow a fluid flow between the respective recovery unit and ground level, and means coupled with the valves for sequentially actuating the same.

7. Apparatus as set forth in claim 6, wherein said sequential actuating means includes a timer.

8. Apparatus as set forth in claim 6, wherein is included a source of air under pressure, a pipe connecting the air pressure source with each recovery unit, respectively, to permit the recovery unit to be pressurized to cause the liquid hydrocarbons collected therein to move through the respective conduit, each valve being operable to control the fluid flow through the respective pipe.

9. Apparatus as set forth in claim 6, wherein said forcing means includes a suction device, the conduit for each recovery unit, respectively, being coupled to the suction device, each valve being coupled with a respective conduit for controlling the fluid flow between the suction device and the respective recovery unit.

10. Apparatus as set forth in claim 1, wherein each recovery unit includes a receptacle coupled with the housing for collecting and holding the liquid hydrocarbons flowing into the housing, said forcing means including a source of air under pressure, a pipe connecting the air pressure source with the receptacle of a respective recovery unit, a valve coupled with the pipe for controlling the flow of air under pressure to the receptacle, and a timer coupled with the valve for sequentially actuating the valve.

11. Apparatus as set forth in claim 10, wherein each receptacle is coupled to the lower portion of the respective housing, there being an opening placing the housing and receptacle in fluid communication with each other, and a one-way valve coupled with the opening for closing the same when the receptacle is pressurized.

12. Apparatus as set forth in claim 10, wherein is included a brake coupled with the recovery unit in each well casing, respectively for releasably holding the recovery unit in a fixed position within the respective well casing.

13. Apparatus as set forth in claim 12, wherein the brake is fluid actuated.

14. Apparatus as set forth in claim 12, wherein the brake includes a piston and cylinder assembly, the piston being in fluid communication with the receptacle for urging the piston in one direction when the receptacle is pressurized, there being a spring for biasing the piston in the opposite direction, an arm means coupled with the piston for releasably engaging the inner surface of the well casing to hold the recovery unit in a fixed position with respect to the well casing when the corresponding valve is deactuated.

15. Apparatus as set forth in claim 1, wherein the housing of each recovery unit has a bottom wall provided with an opening therethrough, the conduit extending downwardly from the bottom wall of the housing and then upwardly through the recovery unit longitudinally of the respective well casing.

16. Apparatus as set forth in claim 15, wherein is included means for venting the respective housing to the region in the well casing above the respective recovery unit, said conduit being at least partially flexible.

17. Apparatus as set forth in claim 1, wherein said forcing means includes a submersible pump in at least one of the well casings and coupled with the respective recovery unit, the pump having an impeller and means for rotating the impeller, the respective conduit coupled with the impeller for receiving liquid hydrocarbons collected by the respective recovery unit.

18. Apparatus as set forth in claim 17, wherein the rotating means of each pump is fluid actuated.

19. Apparatus as set forth in claim 17, wherein each pump is carried by the respective flotation member.

20. Apparatus as set forth in claim 17, wherein the pump has a pipe for coupling the rotating means thereof to a source of fluid under pressure, the rotating means being vented to the region above the recovery unit in the corresponding well casing.

21. Apparatus as set forth in claim 1, wherein each well casing has a diameter in the range of 2 to 4 inches.

22. Apparatus as set forth in claim 1, wherein the spacing is between an adjacent pair of well casings and is in the range of 5 to 40 feet.

23. Apparatus as set forth in claim 1, wherein each well casing and its recovery unit has means for preventing the recovery unit from rotating about a vertical axis.

24. Apparatus for recovery of liquid hydrocarbons on ground water below ground level comprising: a perforated well casing adapted to be driven into the ground through the interface between the liquid hydrocarbons and the ground water so that the liquid hydrocarbons can enter the well casing; a recovery unit for the well casing, the recovery unit including a housing for collecting liquid hydrocarbons, the housing having a semipermeable membrane defining the outer surface thereof, the membrane being pervious to the liquid hydrocarbons and impervious to the ground water, and a flotation member coupled with the housing to permit the latter to be floated on the ground water such that a portion of the housing intersects the interface between the liquid hydrocarbons and the ground water; a conduit coupled with the recovery unit and adapted to be coupled to a fluid receiver remote from the recovery unit for directing liquid hydrocarbons from the housing to the receiver; and means coupled with the recovery unit for sequentially forcing the collected liquid hydrocarbons from the recovery unit to the receiver.

25. Apparatus as set forth in claim 24, wherein said forcing means includes means for supplying a positive fluid pressure to the recovery unit to force the liquid hydrocarbons collected thereby through the conduit and toward the receiver.

26. Apparatus as set forth in claim 24, wherein said forcing means includes suction means coupled with the conduit of the recovery unit for drawing liquid hydrocarbons through the conduit by a suction force.

27. Apparatus as set forth in claim 24, wherein said forcing means includes means for pressurizing the well casing to force collected liquid hydrocarbons through the conduit and toward the receiver.

28. Apparatus as set forth in claim 24, wherein said forcing means includes submersible pump for the well casing, the pump having an impeller for directing the liquid hydrocarbons through the conduit toward the receiver.

29. Apparatus as set forth in claim 24, wherein said forcing means includes a valve for the well casing, the valve being operable to allow a fluid flow between the recovery unit and ground level, and means coupled with the valve for actuating the same.

30. Apparatus as set forth in claim 29, wherein said actuating means includes a timer.

31. Apparatus as set forth in claim 29, wherein is included a source of air under pressure, a pipe connecting the air pressure source with the recovery unit to permit the recovery unit to be pressurized to cause the liquid hydrocarbons collected therein to more through the conduit, the valve being operable to control the fluid flow through the pipe.

32. Apparatus as set forth in claim 29, wherein said forcing means includes a suction device, the conduit for the recovery unit being coupled to the suction device, the valve being coupled with the conduit for controlling the fluid flow between the suction device and the recovery unit.

33. Apparatus as set forth in claim 24, wherein the recovery unit includes a receptacle coupled with the housing for collecting and holding the liquid hydrocarbons flowing into the housing; said forcing means including a source of air under pressure, a pipe connecting the air pressure source with he receptacle of the recovery unit, a valve coupled with the pipe for controlling the flow of air under pressure to the receptacle, and a timer coupled with the valve for actuating the valve.

34. Apparatus as set forth in claim 33, wherein the receptacle is coupled to the lower portion of the housing, there being an opening placing the housing and receptacle in fluid communication with each other, and a one-way valve coupled with the opening for closing the same when the receptacle is pressurized.

35. Apparatus as set forth in claim 33, wherein is included a brake coupled with the recovery unit in the well casing for releasably holding the recovery unit in a fixed position within the well casing.

36. Apparatus as set forth in claim 35, wherein the brake is fluid actuated.

37. Apparatus as set forth in claim 35, wherein the brake includes a piston and cylinder assembly, the piston being in fluid communication with the receptacle for urging the piston in one direction when the receptacle is pressurized, there being a spring for biasing the piston in the opposite direction, an arm means coupled with the piston for releasably engaging the inner surface of the well casing to hold the recovery unit in a fixed position with respect to the well casing when the corresponding valve is deactuated.

38. Apparatus as set forth in claim 24, wherein the housing of each recovery unit has a bottom wall provided with an opening therethrough, the conduit extending downwardly from the bottom wall of the housing and then upwardly through the recovery unit longitudinally of the well casing.

39. Apparatus as set forth in claim 38, wherein is included means for venting the housing to the region in the well casing above the recovery unit, said conduit being at least partially flexible.

40. Apparatus as set forth in claim 24, wherein said forcing means includes submersible pump in the well casing and coupled with the recovery unit, the pump having an impeller and means for rotating the impeller, the conduit being coupled with the impeller for receiving liquid hydrocarbons collected by the recovery unit.

41. Apparatus as set forth in claim 40, wherein the rotating means of the pump is fluid actuated.

42. Apparatus as set forth in claim 40, wherein the pump is carried by the flotation member.

43. Apparatus as set forth in claim 40, wherein the pump has a pipe for coupling the rotating means thereof to a source of fluid under pressure, the rotating means being vented to the region above the recovery unit in the well casing.

44. Apparatus as set forth in claim 24, wherein the well casing has a diameter in the range of 2 to 4 inches.

45. Apparatus as set forth in claim 24, wherein the well casing and the recovery unit has means for preventing the recovery unit from rotating about a vertical axis.

* * * * *